US009144048B2

(12) United States Patent  (10) Patent No.: US 9,144,048 B2
Joung et al.  (45) Date of Patent: Sep. 22, 2015

(54) LTE CELL DETECTING APPARATUS IN MULTI-CELL ENVIRONMENT

(71) Applicant: INNOWIRELESS CO., LTD., Seongnam-si, Gyeonggi-do (KR)

(72) Inventors: Jin-Soup Joung, Gyeonggi-do (KR); Joo-Hyeong Lee, Seoul (KR); Yong-Hoon Lim, Seoul (KR); Byung-Kwan Jang, Gyeonggi-do (KR)

(73) Assignee: INNOWIRELESS CO. LTD (KR)

( * ) Notice: Subject to any disclaimer, the term of this patent is extended or adjusted under 35 U.S.C. 154(b) by 184 days.

(21) Appl. No.: 13/903,373

(22) Filed: May 28, 2013

(65) Prior Publication Data

US 2014/0301385 A1   Oct. 9, 2014

(30) Foreign Application Priority Data

Apr. 3, 2013  (KR) .................... 10-2013-0036549

(51) Int. Cl.
*H04W 56/00* (2009.01)
*H04J 11/00* (2006.01)

(52) U.S. Cl.
CPC ....... *H04W 56/0015* (2013.01); *H04J 11/0076* (2013.01)

(58) Field of Classification Search
CPC . H04W 56/0015; H04W 72/04; H04W 72/02; H04W 48/16; H04W 4/00; H04W 24/00; H04W 72/042; H04W 72/0446; H04W 72/0453; H04L 7/04; H04L 7/00; H04L 5/0053; H04J 3/06
USPC ................. 370/203, 225, 329, 330, 336, 350; 375/267, 340, 343, 354; 455/422.1, 455/434, 515, 67.13
See application file for complete search history.

(56) References Cited

U.S. PATENT DOCUMENTS

2009/0257411 A1\*  10/2009  Shitara ........................ 370/336
2010/0002678 A1\*  1/2010  Terabe et al. ................ 370/350
2010/0085838 A1\*  4/2010  Altman et al. ............... 367/124

(Continued)

OTHER PUBLICATIONS

Pei-Yun Tsai et al: "A new cell search scheme in 3GPP long term evolution downlink, OFDMA systems", Wireless Communications &Signal Processing, 2009. WCSP 2009. International Conference on, IEEE, Piscataway, NJ, USA, Nov. 13, 2009, pp. 1-5, XP031594619, ISBN: 978-1-4244-4856-2.\*

*Primary Examiner* — Jamal Javaid
*Assistant Examiner* — Wali Butt
(74) *Attorney, Agent, or Firm* — Kaplan Breyer Schwarz & Ottesen, LLP

(57) ABSTRACT

Long Term Evolution (LTE) cell detecting apparatus includes a secondary synchronization signal (SSS) reference signal generating unit for generating reference signals of all SSSs included in a specific subframe, a memory for storing a reference phase difference sequence with respect to the reference signal of the SSS generated, a Fast Fourier Transform (FFT) operation unit for performing an FFT operation with respect to a received radio signal to output a primary synchronization signal (PSS) and an SSS, a time synchronization acquisition unit for acquiring LTE time synchronization by the PSS output from the FFT operation unit, and a cell detection unit for detecting an LTE cell by the time synchronization information acquired by the time synchronization acquisition unit and a correlation between a phase difference sequence of a received SSS output from the FFT operation unit and the reference phase difference sequence stored in the memory.

3 Claims, 5 Drawing Sheets

(56) References Cited

U.S. PATENT DOCUMENTS

| | | | |
|---|---|---|---|
| 2010/0182979 A1* | 7/2010 | Malladi et al. | 370/336 |
| 2011/0243122 A1* | 10/2011 | Lindoff et al. | 370/350 |
| 2011/0255394 A1* | 10/2011 | Zha et al. | 370/203 |
| 2012/0100880 A1* | 4/2012 | Baek et al. | 455/515 |
| 2012/0120882 A1* | 5/2012 | Luo et al. | 370/329 |
| 2014/0037028 A1* | 2/2014 | Shin et al. | 375/340 |
| 2014/0056392 A1* | 2/2014 | Quanbeck | 375/343 |

* cited by examiner

LTE CELL DETECTING APPARATUS IN MULTI-CELL ENVIRONMENT

CROSS-REFERENCE TO RELATED APPLICATION

This application claims priority to and the benefit of Korean Patent Application No. KR 10-2013-0036549, filed on Apr. 3, 2013, the disclosure of which is incorporated herein by reference in its entirety.

BACKGROUND

1. Field of the Invention

The present invention relates to a Long Term Evolution (LTE) cell detecting apparatus in a multi-cell environment that may efficiently detect an LTE cell even in a multi-cell environment where interference occurs between adjacent cells.

2. Discussion of Related Art

FIG. 1 shows a configuration of a wireless frame of 10 ms in a Long Term Evolution (LTE) Frequency Division Duplexing (FDD) method. As shown in FIG. 1, in an LTE communication system, cell detection is performed by a synchronization signal (SS). Such an SS is divided again into a primary synchronization signal (PSS) and a secondary synchronization signal (SSS), and each of the PSS and the SSS is transmitted twice per 10 ms at a time slot that is defined in advance.

Meanwhile, the LTE communication system has a total of 504 physical layer cell IDs to confirm the cell, the 504 physical layer cell IDs are divided again into 168 cell ID groups $N_{ID}^{(1)}$, and each of the groups is composed of 3 physical layer IDs $N_{ID}^{(2)}$. Accordingly, each of the cell groups includes 3 physical layer IDs such as 0, 1, and 2.

One of 504 physical layer cell IDs is allocated to each of the LTE cells so that the cell can be confirmed, and a terminal receives multiple LTE downlink signals in a wireless mobile communication environment, and therefore each of the physical layer cell IDs of the received LTE downlink signals should be detected to be used in network access, handover, and the like.

The following Equation 1 is a sequence for generating a PSS.

$$d_u(n) = \begin{cases} e^{-j\frac{\pi u n(n+1)}{63}}, & n = 0, 1, \ldots, 30 \\ e^{-j\frac{\pi u(n+1)(n+2)}{63}}, & n = 31, 32, \ldots, 61 \end{cases} \quad \text{[Equation 1]}$$

A conventional sequence $d_u(n)$ for generating a PSS is generated as a Zadoff-chu sequence as shown in Equation 1, and a root sequence index u of the Zadoff-chu sequence is determined by a value of $N_{ID}^{(2)}$ as shown in the following Table 1.

TABLE 1

| $N_{ID}^{(2)}$ | Root index u |
| --- | --- |
| 0 | 25 |
| 1 | 29 |
| 2 | 34 |

An SSS transmits 168 pieces of $N_{ID}^{(1)}$ information, and is composed of two m-sequences each having a length of 31 bits. The m-sequence having the length of 31 bits that defines the SSS is differently configured in a subframe 0 and a subframe 5 as shown in the following Equation 2.

$$d(2n) = \begin{cases} S_0^{(m_0)}(n)c_0(n) & \text{in subframe 0} \\ S_1^{(m_1)}(n)c_0(n) & \text{in subframe 5} \end{cases} \quad \text{[Equation 2]}$$

$$d(2n+1) = \begin{cases} S_1^{(m_1)}(n)c_1(n)Z_1^{(m_0)}(n) & \text{in subframe 0} \\ S_0^{(m_0)}(n)c_1(n)Z_1^{(m_1)}(n) & \text{in subframe 5} \end{cases}$$

As can be seen from Equation 2, a plurality of two sequences $S_0^{(m_0)}$ and $S_1^{(m_1)}$ are determined by $m_0$ and $m_1$ determined by $N_{ID}^{(1)}$, and when $m_0$ and $m_1$ between adjacent cells are equal in a state in which a terminal receives a plurality of SSSs, cell detection may be difficult due to increased interference.

In addition, when the terminal receives a plurality of SSSs, interference is increased due to characteristics of the m-sequence for generating the SSS, and therefore the detection performance of the cell is deteriorated.

SUMMARY OF THE INVENTION

The present invention is directed to a Long Term Evolution (LTE) cell detecting apparatus in a multi-cell environment that may efficiently detect an LTE cell even in a multi-cell environment where interference occurs between adjacent cells.

According to an aspect of the present invention, there is provided a Long Term Evolution (LTE) cell detecting apparatus in a multi-cell environment, the apparatus including: a secondary synchronization signal (SSS) reference signal generating unit for generating reference signals of all SSSs included in a specific subframe; a memory for storing a reference phase difference sequence with respect to the reference signal of the SSS generated by the SSS reference signal generating unit; a Fast Fourier Transform (FFT) operation unit for performing an FFT operation with respect to a received radio signal to output a primary synchronization signal (PSS) and an SSS; a time synchronization acquisition unit for acquiring LTE time synchronization by the PSS output from the FFT operation unit; and a cell detection unit for detecting an LTE cell by the time synchronization information acquired by the time synchronization acquisition unit and a correlation between a phase difference sequence of a received SSS output from the FFT operation unit and the reference phase difference sequence stored in the memory.

The specific subframe may be a subframe 0 or a subframe 5, and a total number of the SSSs may be 168.

In each of the SSSs, two m-sequences each having a length of 31 bits may be arranged to cross each other in the subframe 0 and the subframe 5 in a different order.

The phase difference sequence may be determined by $r(n)=x(n) \cdot \text{conj}(x(n+1))$, where n represents a number of 0 to 61, x(n) represents SSSs of subframes 0 and 5, and conj represents a conjugate operation.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

In general, in a Long Term Evolution (LTE) communication system, a 5 ms timing is detected using a primary synchronization signal (PSS) in which the same signal is transmitted for each 5 ms, and a boundary of a downlink frame is detected using a secondary synchronization signal (SSS). In this manner, when the boundary of the downlink frame is detected, $N_{ID}^{cell}$ that is a physical layer cell ID should be detected. However, when parameters of $m_0$ and $m_1$ for generating an SSS are equal in a multi-cell environment where a plurality of LTE signals are received or between adjacent cells, $S_0^{(m_0)}$ and $S_1^{(m_1)}$ are equal as shown in the above Equation 2, and therefore SSS detection is difficult due to increased interference between SSSs using an m-sequence.

In order to overcome this problem, according to an embodiment of the present invention, a phase difference in consecutive adjacent sequences is used to efficiently detect an SSS in a multi-cell environment in which a plurality of LTE signals are received.

Figure 1:
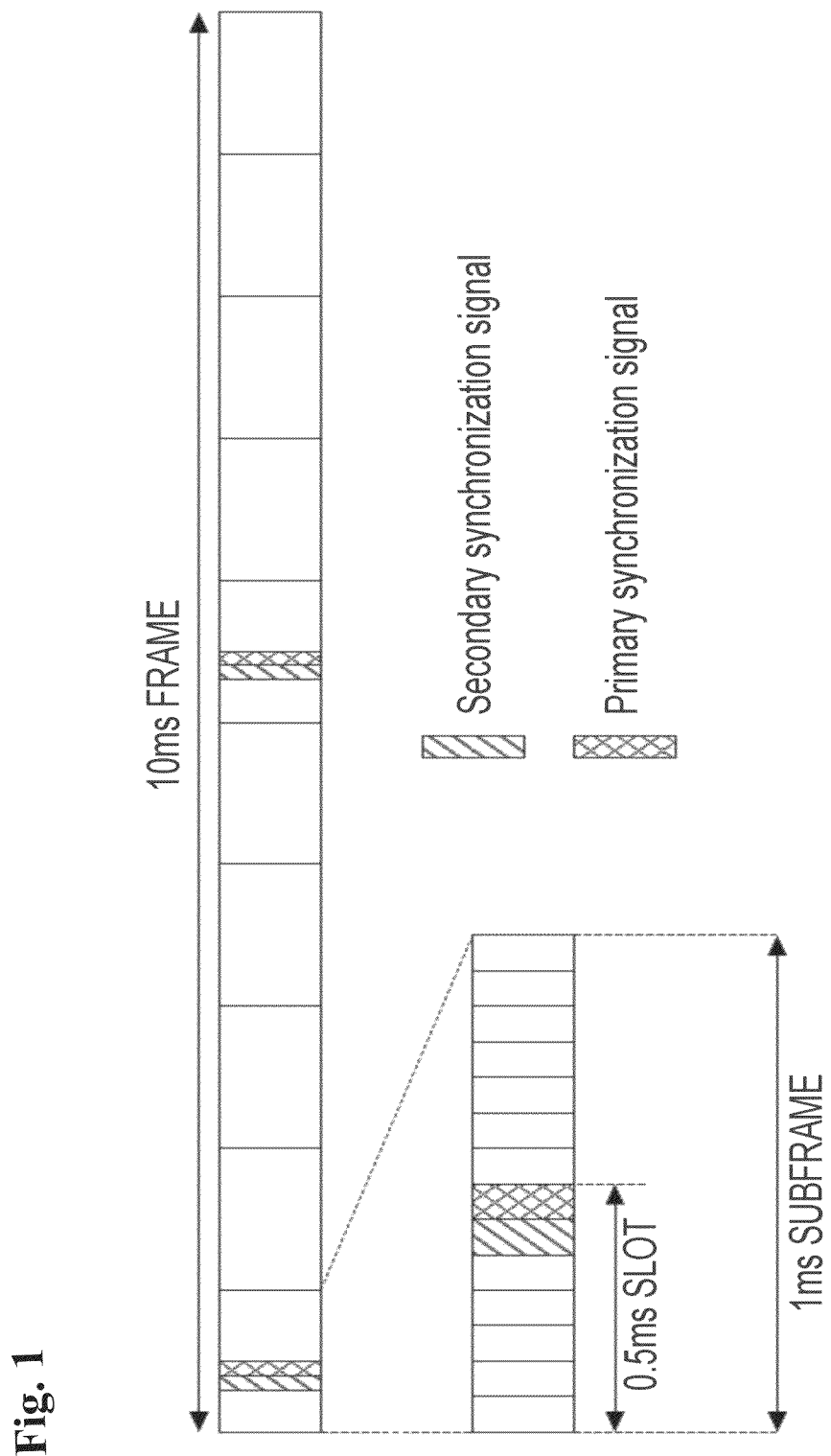
FIG. 1 shows a configuration of a wireless frame of 10 ms in a Long Term Evolution (LTE) Frequency Division Duplexing (FDD) method.
Figure 2A:
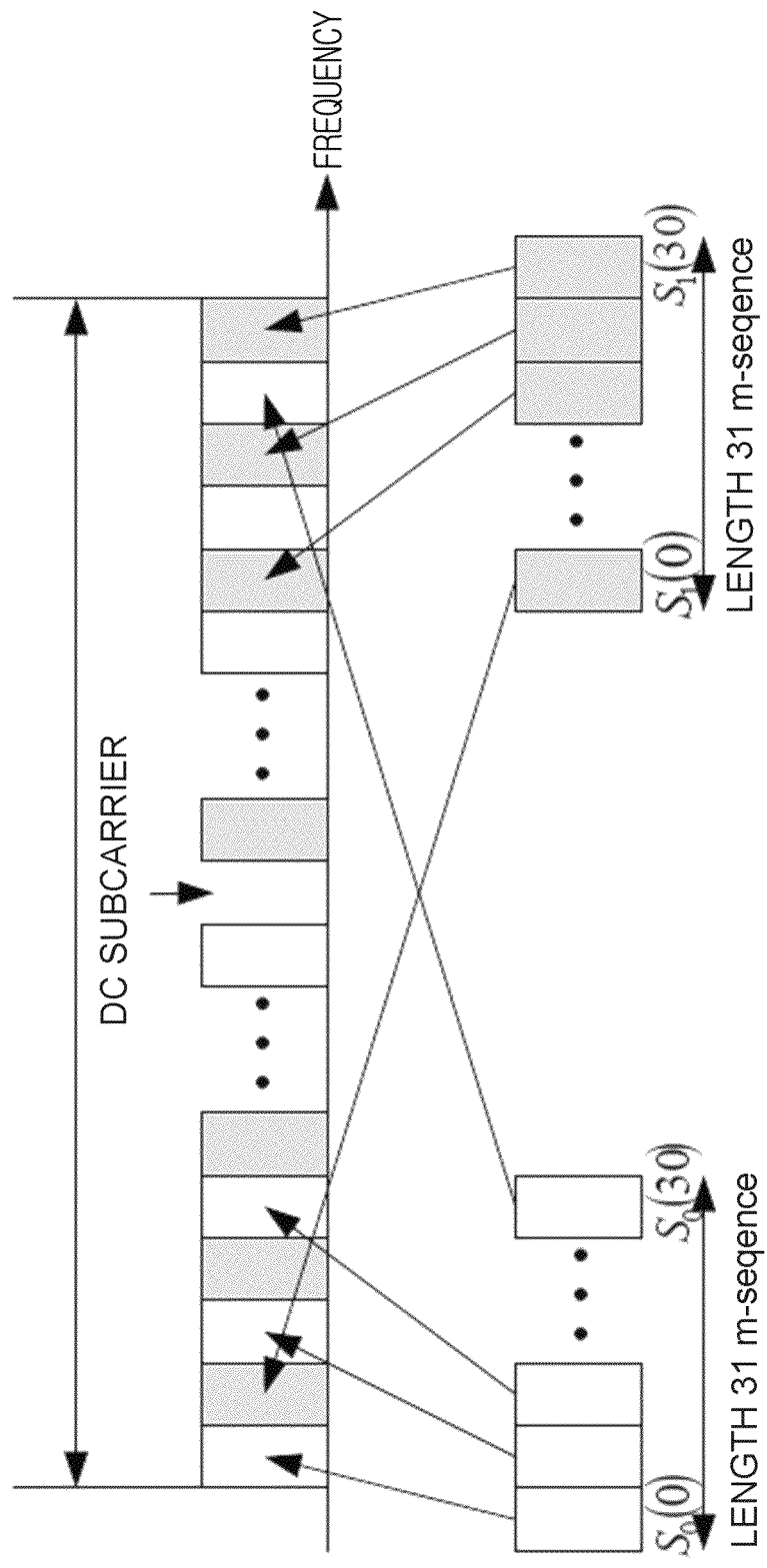
FIGS. 2A and 2B respectively show a principle of generating a secondary synchronization signal (SSS) sequence that is repeatedly transmitted per 5 ms in subframes 0 and 5 according to an LTE standard.
Figure 2B:
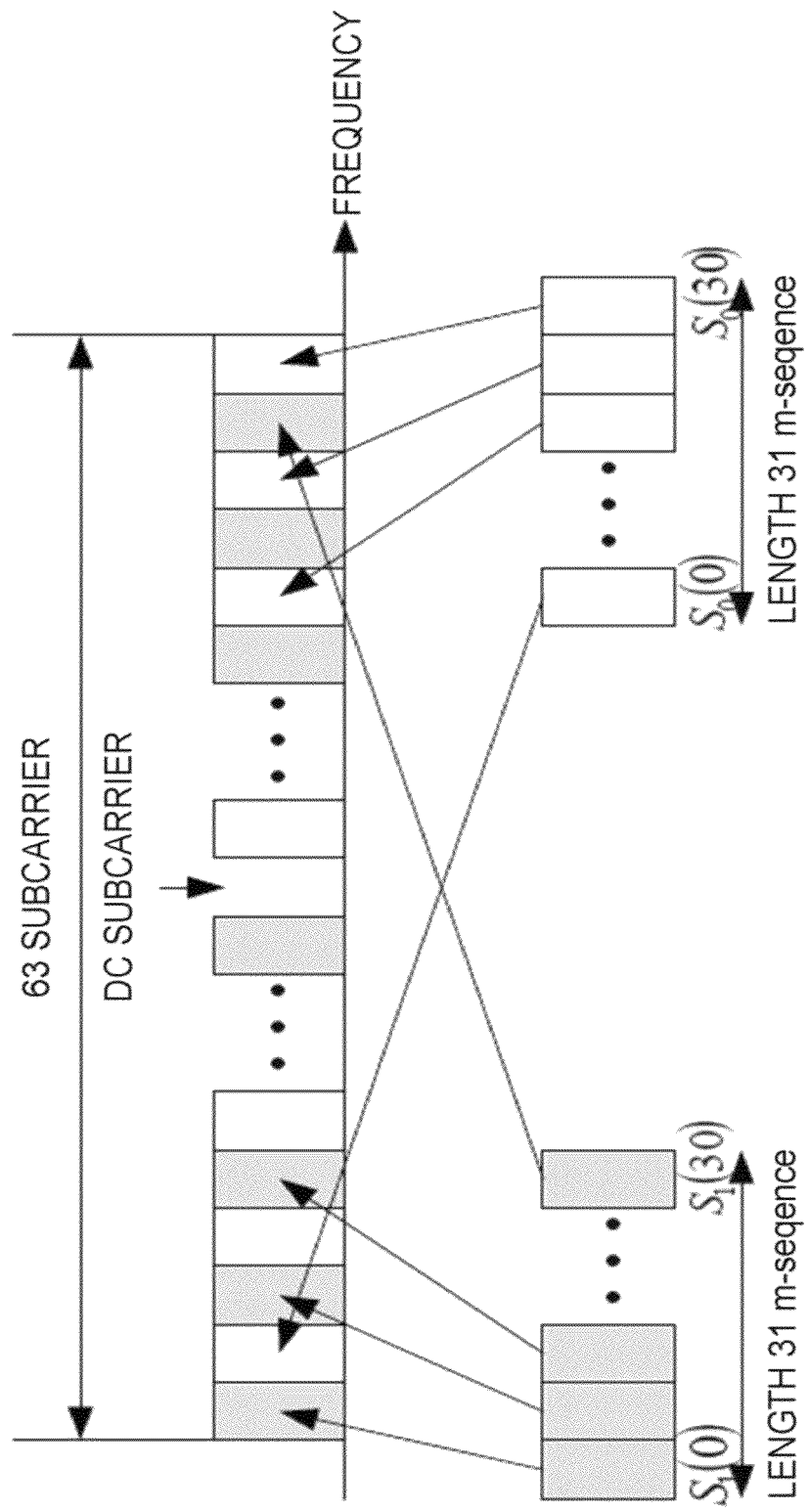

FIGS. 2A and 2B respectively show a principle of generating an SSS sequence that is repeatedly transmitted per 5 ms in subframes 0 and 5 according to an LTE standard. As can be seen from FIG. 2, in order to generate 62 SSS sequences, two m-sequences each having a length of 31 bits are generated, and then the generated two m-sequences are arranged so as to cross each other in a different order in subframes 0 and 5.

According to an embodiment of the present invention, using characteristics in which the two independent m-sequences are arranged so as to cross each other, the SSS is detected.

Figure 3:
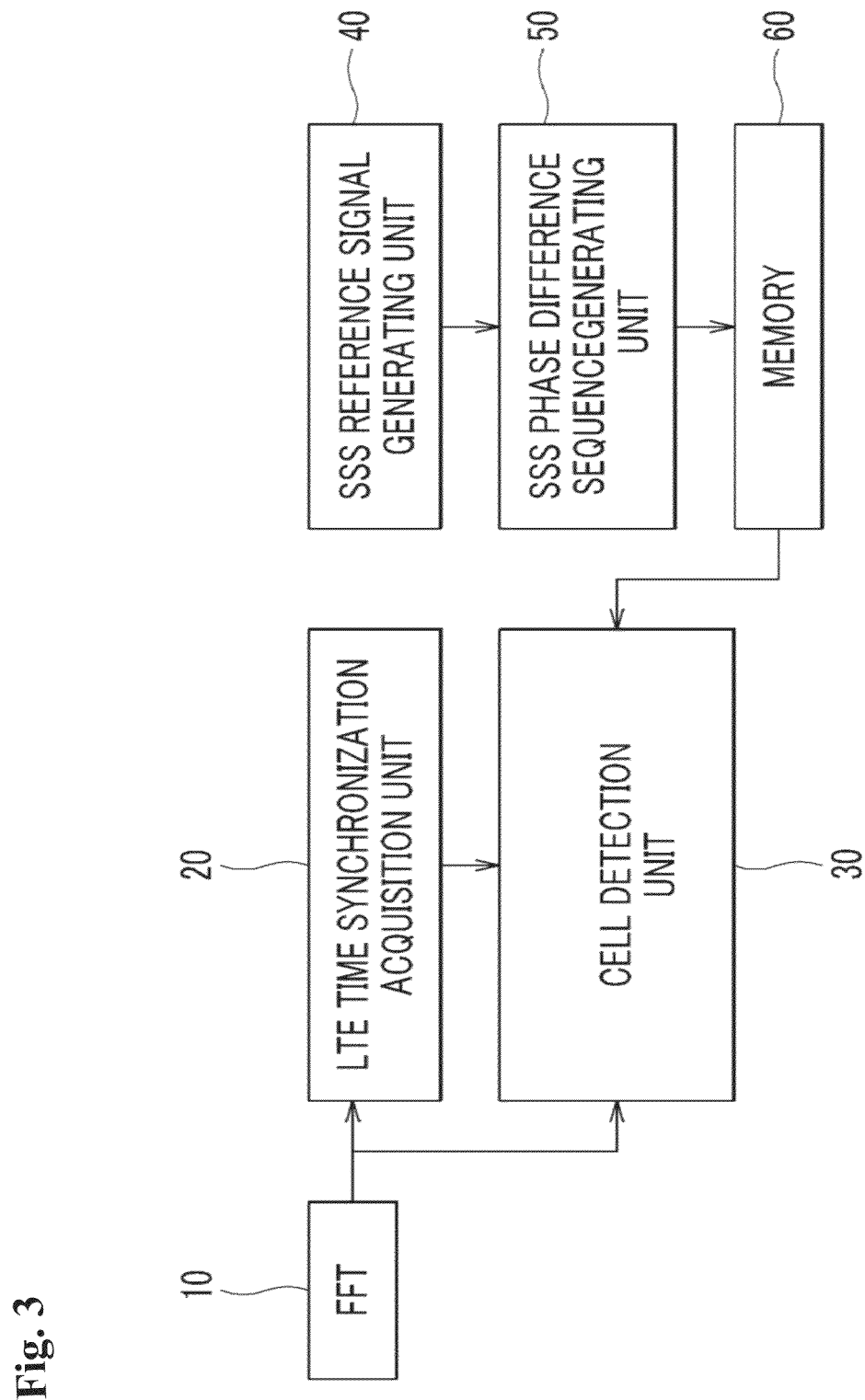
FIG. 3 is a block diagram of an LTE cell detecting apparatus in a multi-cell environment according to an embodiment of the present invention.

FIG. 3 is a block diagram of an LTE cell detecting apparatus in a multi-cell environment according to an embodiment of the present invention. As shown in FIG. 3, the LTE cell detecting apparatus in a multi-cell environment includes an SSS reference signal generating unit 40 that generates a total of 168 SSS reference signals to be included in a subframe 0 and a subframe 5, an SSS phase difference sequence generating unit 50 that generates a reference phase difference sequence of a total of 168 SSS reference signals of subframes 0 and 5 generated by the SSS reference signal generating unit 40, a memory 60 that stores the reference phase difference sequence generated by the SSS phase difference sequence generating unit 50, a Fast Fourier Transform (FFT) operation unit 10 that performs an FFT operation with respect to signals converted serially and parallelly after removing a Cyclic Prefix (CP) from a received wireless signal so as to output a PSS and an SSS, a time synchronization acquisition unit 20 that acquires LTE time synchronization by the PSS output from the FFT operation unit 10, and a cell detection unit 30 that detects an LTE cell by the time synchronization information acquired by the time synchronization acquisition unit 20 and a correlation between a phase difference sequence of a received SSS output from the FFT operation unit 10 and the 168 reference phase difference sequences stored in the memory 60.

Figure 4:
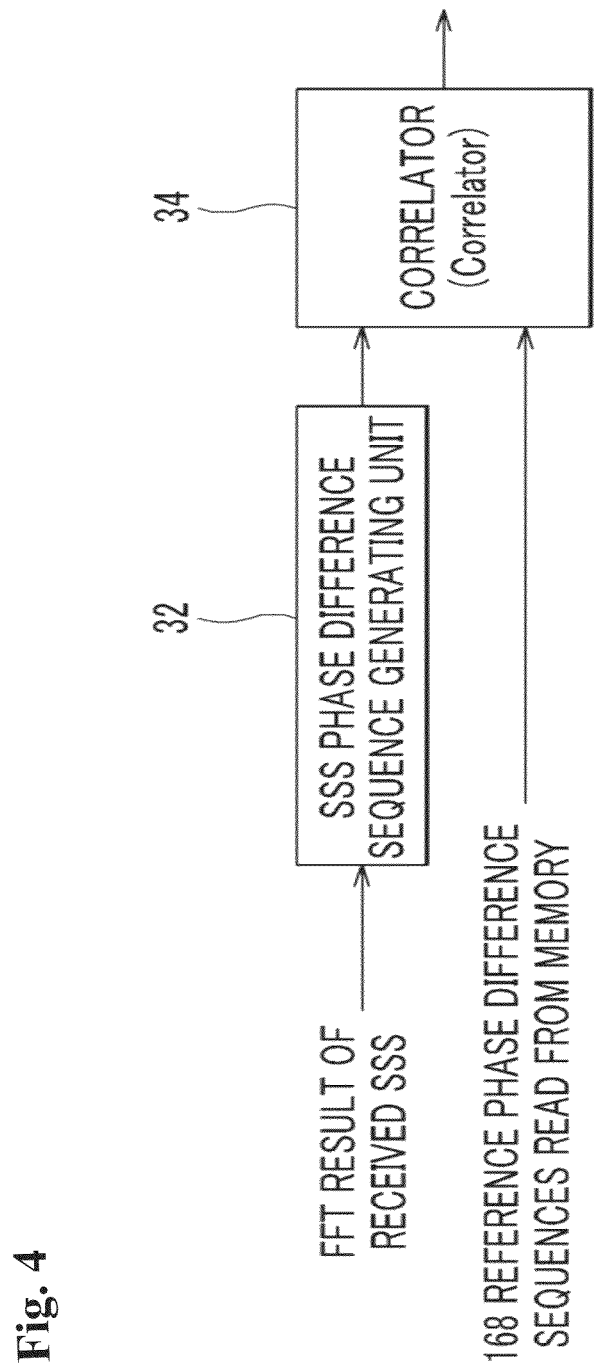
FIG. 4 is a detailed block diagram of the cell detection unit of FIG. 3.

FIG. 4 is a detailed block diagram of the cell detection unit of FIG. 3.

As shown in FIG. 4, the cell detection unit 30 according to an embodiment of the present invention receives an FFT operation result of an SSS existing in the subframes 0 and 5 received from a base station, calculates a correlation between a phase difference sequence of a received SSS output from a SSS phase difference sequence generating unit 32 for generating a phase difference sequence of a received SSS and a total of 168 reference phase difference sequences read from the memory 60, and determines an SSS having the highest correlation as the received SSS, thereby detecting the LTE cell.

The phase difference sequence of the SSS existing in the subframes 0 and 5 is generated as shown in the following Equation 3.

$$r(n)=x(n)\cdot\mathrm{conj}(x(n+1)) \qquad \text{[Equation 3]}$$

In Equation 3, n represents a number of 0 to 61, x(n) represents SSSs of subframes 0 and 5, and conj represents a conjugate operation.

As described above, according to an embodiment of the present invention, the LTE cell detecting apparatus in the multi-cell environment may accurately detect an SSS even in a multi-cell environment where interference between adjacent cells occurs, and efficiently and accurately detect an LTE cell based on the detected SSS.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A Long Term Evolution (LTE) cell detecting apparatus in a multi-cell environment, the apparatus comprising:
   a secondary synchronization signal (SSS) reference signal generating unit for generating reference signals of all SSSs included in a specific subframe;
   a memory for storing a reference phase difference sequence with respect to the reference signal of the SSS generated by the SSS reference signal generating unit;
   a Fast Fourier Transformation (FFT) operation unit for performing an FFT operation with respect to a received radio signal to output a primary synchronization signal (PSS) and an SSS;
   a time synchronization acquisition unit for acquiring LTE time synchronization by the PSS output from the FFT operation unit; and
   a cell detection unit for detecting an LTE cell by the time synchronization information acquired by the time synchronization acquisition unit and a correlation between a phase difference sequence of a received SSS output from the FFT operation unit and the reference phase difference sequence stored in the memory, wherein the phase difference sequence is determined by:

$$r(n)=x(n)\cdot \mathrm{conj}(x(n+1)),$$

where n represents a number from 0 to 61, x(n) represents SSSs of subframes 0 and 5, and conj represents a conjugate operation.

2. The LTE cell detecting apparatus of claim 1, wherein the specific subframe is a subframe 0 or a subframe 5, and a total number of the SSSs is 168.

3. The LTE cell detecting apparatus of claim 2, wherein, in each of the SSSs, two m-sequences each having a length of 31 bits are arranged to cross each other in the subframe 0 and the subframe 5 in a different order.

* * * * *